M. EICHLER.
GRAVY DISH.
APPLICATION FILED OCT. 29, 1912.
1,121,993.
Patented Dec. 22, 1914.
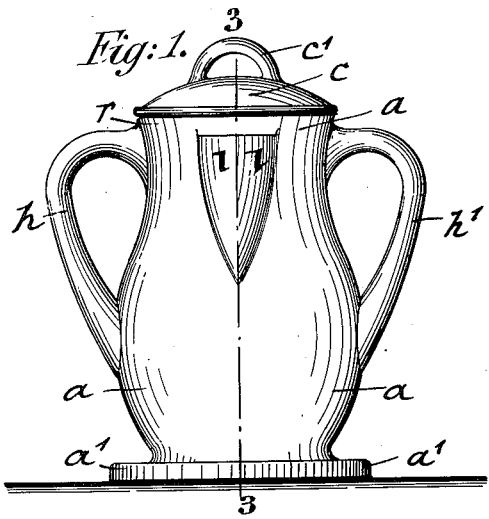
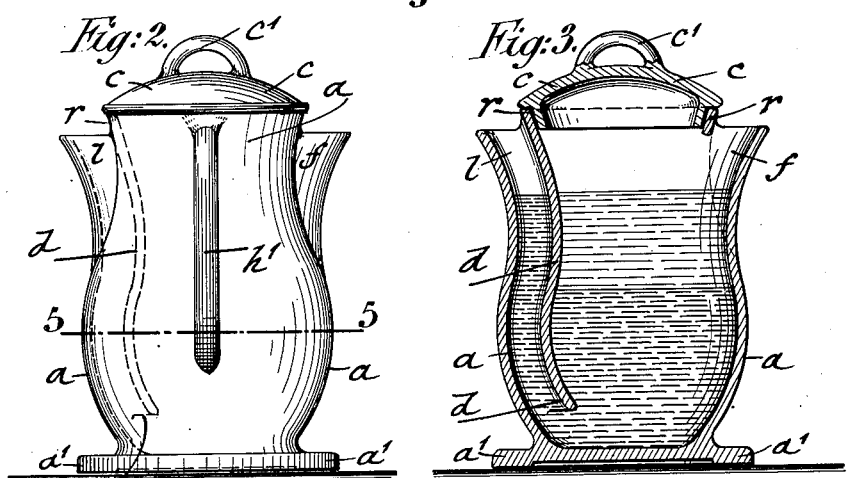
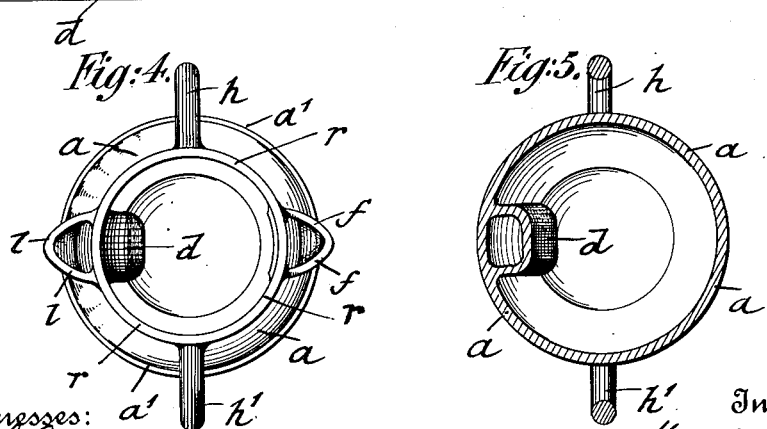
Inventor
Mathilde Eichler

UNITED STATES PATENT OFFICE.

MATHILDE EICHLER, OF NEW YORK, N. Y.

GRAVY-DISH.

1,121,993.     Specification of Letters Patent.     Patented Dec. 22, 1914.

Application filed October 29, 1912. Serial No. 728,372.

*To all whom it may concern:*

Be it known that I, MATHILDE EICHLER, a citizen of the United States of America, residing in New York, in the borough of the Bronx, county and State of New York, have invented certain new and useful Improvements in Gravy-Dishes, of which the following is a specification.

This invention relates to an improved gravy-dish by which the gravy may be poured out at one side or the other, one side giving lean gravy and the other fat gravy, as desired, without the use of a spoon for ladling out the gravy, and adapting the gravy-dish in a high degree for the use of boarding houses, hotels, restaurants and wherever a large number of persons have to be served with meals; and for this purpose the invention consists of a gravy-dish which is provided with two handles at diametrically-opposite points of the dish, two spouts also at diametrically-opposite points of the dish but in a plane at right angles to the plane of the handles, and a partition that extends from one spout parallel with the same and the body of the dish to some distance from the bottom thereof so as to permit the pouring of lean gravy, that is to say, gravy without fat, through the partitioned-off spout, and fat gravy, that is to say, gravy with fat on it, through the opposite non-partitioned spout.

In the accompanying drawing, Figure 1 represents a front-elevation of my improved gravy-dish, Fig. 2 is a side-elevation, taken at right angles to the view shown in Fig. 1, Fig. 3 is a vertical transverse section on line 3, 3, Fig. 1, Fig. 4 is a plan-view of Fig. 2, with the lid removed, and Fig. 5 is a horizontal section on line 5, 5, Fig. 2.

Similar letters of reference indicate corresponding parts throughout the different figures of the drawing.

Referring to the drawing, $a$ represents the body of a gravy-dish of any desired shape and material, preferably, however, of porcelain or stoneware. The body $a$ is provided at diametrically-opposite points with handles $h$, $h^1$ which are arranged symmetrically to the vertical center-plane of the body so as to improve the appearance of the dish. At points intermediately of the handles $h$, $h^1$ are arranged, at the upper part of the body and at diametrically-opposite points of the same, two spouts $l$ and $f$ which communicate with the interior of the body $a$. A curved partition $d$ extends parallel with the outlines of the spout $l$ and body $a$, from the upper end of the body in downward direction to some distance from the bottom of the body $a$, as shown in Figs. 2 and 3, said partition forming a channel by which the lean gravy, which settles in the lower part of the body, is delivered through the lateral spout $l$, while the gravy with the fat floating on the same is discharged through the opposite lateral spout $f$. At the upper part of the body $a$, the spouts $l$ and $f$ are connected by a circular rim $r$, which is made slightly inclined and closed by a lid $c$ having a handle $c^1$, as shown clearly in Fig. 3 of the drawing. The lower portion or bottom of the body $a$ is provided with an enlarged base-rim $a^1$ so as to prevent the tilting of the dish when placed on the table.

The improved gravy-dish has the advantage that it can be passed readily around the table and that the gravy can be poured from the same without the use of a spoon either through the spout $l$, when lean gravy is desired, or through the spout $f$, when fat gravy is desired, according to the special predilection of the person pouring the gravy. The spout through which the lean gravy is discharged is preferably marked "Lean", and the other "Fat", so as to indicate clearly to the user of the dish which spout will supply the lean and which the fat gravy. By the use of the dish, the supply of gravy at the table is greatly facilitated and expedited, which is of considerable advantage especially when a large number of people have to be fed, as in hotels, restaurants, boarding houses and the like.

I claim:

1. A gravy dish having a duplex capacity of pouring fat gravy from the top layer of liquid contained therein or lean gravy from the bottom layer thereof, comprising a body provided with two laterally projecting pouring spouts disposed at opposite sides thereof, one of said spouts being open to the upper layer of liquid and the other spout being closed to said upper layer and having a connecting tube opening into the lower layer thereof.

2. A gravy dish having a duplex capacity of pouring fat gravy from the top layer of liquid contained therein or lean gravy from the bottom layer thereof, comprising a body provided with two laterally projecting pouring spouts disposed at opposite sides thereof, one of said spouts being open to the upper layer of liquid and the other spout being closed to said upper layer and having a connecting tube opening into the lower layer thereof, said body having a continuous rim at its top extending above the flaring spouts and a cover supported on said rim.

In testimony, that I claim the foregoing as my invention, I have signed my name in presence of two subscribing witnesses.

MATHILDE EICHLER.

Witnesses:
　JOHN MURTAGH,
　GRACE LOWE.